US010427919B2

(12) United States Patent
Rodríguez Mijangos et al.

(10) Patent No.: US 10,427,919 B2
(45) Date of Patent: Oct. 1, 2019

(54) APPLICATION AND METHOD FOR POSITIONING AND ORIENTATING A LOAD

(71) Applicant: FUNDACIÓN TECNALIA RESEARCH AND INNOVATION, San Sebastián (Guipúzcoa) (ES)

(72) Inventors: María de la O Rodríguez Mijangos, San Sebastián (ES); Cédric Baradat, Montpellier (FR); Jean-Baptiste Izard, Montpellier (FR); Micaël Michelin, Montpellier (FR); Hai Yang, Montpellier (FR); Damien Sallé, San Sebastián (ES)

(73) Assignee: FUNDACIÓN TECNALIA RESEARCH AND INNOVATION, San Sebastián (Guipúzcoa) (ES)

( * ) Notice: Subject to any disclaimer, the term of this patent is extended or adjusted under 35 U.S.C. 154(b) by 310 days.

(21) Appl. No.: 15/343,621

(22) Filed: Nov. 4, 2016

(65) Prior Publication Data
US 2017/0129749 A1    May 11, 2017

(30) Foreign Application Priority Data
Nov. 6, 2015 (EP) ..................................... 15382550

(51) Int. Cl.
*B66C 13/08* (2006.01)
*B66C 13/06* (2006.01)
*B66C 19/00* (2006.01)

(52) U.S. Cl.
CPC .............. *B66C 13/08* (2013.01); *B66C 13/06* (2013.01); *B66C 19/00* (2013.01); *Y02B 10/30* (2013.01)

(58) Field of Classification Search
CPC ............ B66C 13/04–105; B66C 19/00; B66C 19/007
See application file for complete search history.

(56) References Cited

U.S. PATENT DOCUMENTS

| | | | |
|---|---|---|---|
| 3,081,884 A | | 3/1963 | Minty |
| 3,842,986 A | * | 10/1974 | Hupkes .................. B66C 13/06 212/330 |

(Continued)

FOREIGN PATENT DOCUMENTS

WO           9719888 A1    6/1997

*Primary Examiner* — Sang K Kim
*Assistant Examiner* — Nathaniel L Adams
(74) *Attorney, Agent, or Firm* — Cantor Colburn LLP (57) ABSTRACT

An apparatus and method for positioning and orientating a load includes
  a support structure movable in a first direction
  a tendon system having at least six winches mounted on the structure and at least six tendons connected to the winches,
  and a lifting mechanism mounted on the structure. The lifting mechanism includes another tendon and is movable in a second direction perpendicular to the first. The apparatus includes a component suspending the load from above and is
  connected to a second end of each of the tendons and to a free end of the additional tendon. The apparatus further includes a
  control module for translating synchronously and independently an instruction regarding the load in an actuation over the winches, over the lifting mechanism and the support structure, such that at least 51% of the load is sustained by the lifting mechanism and the load is suspended from the further tendon.

23 Claims, 6 Drawing Sheets

(56) References Cited

U.S. PATENT DOCUMENTS

| | | | |
|---|---|---|---|
| 4,666,362 A | | 5/1987 | Landsberger et al. |
| 4,883,184 A | | 11/1989 | Albus |
| 5,585,707 A | | 12/1996 | Thompson et al. |
| 5,769,250 A | * | 6/1998 | Jussila .................. B66C 13/06 |
| | | | 212/274 |
| 6,566,834 B1 | | 5/2003 | Albus et al. |
| 7,267,240 B2 | | 9/2007 | Maurer et al. |
| 2004/0094497 A1 | * | 5/2004 | Oja ........................ B66C 13/06 |
| | | | 212/274 |
| 2005/0024005 A1 | * | 2/2005 | Rodnunsky ............. B66C 13/08 |
| | | | 318/649 |
| 2015/0203334 A1 | * | 7/2015 | Moran .................. B66C 13/063 |
| | | | 212/276 |
| 2017/0350115 A1 | * | 12/2017 | Rocher ................ E04B 1/3505 |

* cited by examiner

APPLICATION AND METHOD FOR POSITIONING AND ORIENTATING A LOAD

CROSS REFERENCE TO RELATED APPLICATIONS

This application is related to and claims the benefit of Spanish Patent Application No. EP15382550.0, filed on Nov. 6, 2015, the contents of which are herein incorporated by reference in their entirety.

TECHNICAL FIELD

The present disclosure is related to the field of manipulators, and more particularly, tendon-driven manipulators comprising a plurality of elongated and flexible traction elements, generically referred to as "tendons" in the present document.

BACKGROUND

The handling and assembly of large and heavy components or machines are two of the most demanding tasks that have to be carried out in many industries. These tasks not only involve moving objects from one position to another, the weight and size of the objects determining the amount of power and space that is necessary for moving them, but often also a relatively precise positioning of the objects in particular spots or locations is required.

The correct placement of an object involves both spatial position and orientation, that is, angular position. This means that three different geometrical coordinates and three different angles have to be considered, so that the system is said to be characterized by six degrees of freedom (6-DOF). Due to the physical characteristics of the often very large and heavy objects to be handled, substantial amounts of technical skills or dexterity are often required for the correct adjustment of the six variables.

Thus, at least two different issues have to be dealt with in the context of handling and assembly: the power or force required for lifting and moving large and heavy objects, and the finesse required for precisely rotating and positioning the objects so as to, for example, position them correctly in relation to other objects or structures present in the workspace. The importance of sufficient hoist capacity and adequate positioning is clear in the case of, for example, the transport and assembly of wind turbines, airplanes, machine tools, heavy structures for buildings, heavy equipment, among others.

Many attempts have been made to design and produce manipulators capable of manipulating heavy loads. Some of the necessary capabilities that these manipulators must feature are, inter alia, control in the six degrees of freedom, precise adjustments in spatial and angular position, reduced sway during the movement of the load, efficient workspace utilization, maximum supported weight and dimensions of the load, etc.

U.S. Pat. No. 3,081,884 teaches a crane comprising a mechanism directed to solve the sway experienced by a load during its handling. This crane allegedly represents an improvement over prior art assemblies alleged to be ineffective or complex and expensive to produce. The disclosed crane incorporates a moving trolley with the anti-sway mechanism comprising a set of ropes that hold, in a suspended manner, a load lifting member with rotary means.

International Patent Application publication no. WO 97/19888 A1 sets forth another crane that allegedly constrains the sway of the load during hoisting operations. The crane includes six reeving cables suspending a lower support structure from an upper support structure wherein attachment points on each of the two structures are arranged on a trapezoidal geometry. The particular geometry of the attachment points may constrain sway movements, and position and attitude of the lower support structure may be adjusted by controlling the length of each of the six reeving cables.

A load handling apparatus with control in the six degrees of freedom is disclosed in U.S. Pat. No. 4,883,184. The apparatus, suitable for use in overhead tower or diagonal boom cranes, comprises an attachment carriage including a single take-up winch adjusting the lengths of all the six cables attached to it; a lifting platform is suspended from the carriage by means of the six cables that are secured to an attachment frame in an equidistant and coplanar arrangement configured to adjust a load imbalance in the horizontal plane. The angular adjustments of the load for the six degrees of freedom is performed by a means for rotation included below the lifting platform.

A robot capable of handling a load in six degrees of freedom is disclosed in U.S. Pat. No. 5,585,707. The robot comprises at least six reels and tendons attached to a manipulated platform and to several anchor points at several locations of the work space. Some anchor points are located at a height higher than the platform and some others at a height lower than the platform, so the platform is suspended by tendons from above and below. The platform is moved and rotated owing to the tendons supporting it, which are controlled by a computer that controls drive means for extending or retracting the tendons individually.

A modular reconfigurable manipulator including a winch support structure with a plurality of attached and independently-controlled winches is disclosed in U.S. Pat. No. 6,566,834. A support of the manipulator is suspended by cables extending from the winches that, by means of their servo axes, wind and unwind the cables so as to position the support at a selected location. Several configurations of the manipulator are possible depending on the number of cables to be used: six, seven or nine, the number of cables being set based on the physical characteristics of the manipulated platform. Even though a six-cable configuration may achieve control in the six degrees of freedom, only limited rotational stability may be provided.

U.S. Pat. No. 4,666,362 is directed to a parallel link manipulator comprising a base on which one end of a central spine and a plurality of cables are mounted, and the other end of the spine and cables are directly or indirectly connected together. Electric or hydraulic spools situated in the base of the manipulator vary the tensions in the cables by adjusting their lengths and, thus, generate a compression on the central spine. The generated compressive force pulls the spine causing the manipulator to move.

Finally, U.S. Pat. No. 7,267,240 B2 discloses a method for maintaining a position of a load on a lifting gear, in which a position of a load, which is suspended from a trolley of a lifting gear via at least four cables, is determined and a swinging motion of the load is counteracted by adjusting the length of at least one of the cables.

It would be highly convenient, for industries which during the course of their activities need to move and rotate large and/or heavy objects, to have a system or equipment that supports moving, positioning and orienting the load in a safe, controlled and precise manner, and which may be easily operated in automatic, semi-automatic or manual modes of operation.

SUMMARY

In order to avoid the problems indicated in the previous section, the disclosure provides an apparatus and a method for positioning and orientating a load, especially a heavy payload, which uses an at least 6-tendon system to stabilize or damp oscillations of such load by providing independent and synchronous actuation over the different elements of the apparatus, the apparatus also comprising a lifting mechanism from which the load is suspended; the apparatus controls that the lifting mechanism supports at least 51% of the weight of the load. The apparatus provides control in the positioning and motion of the load in all six degrees of freedom across a wide workspace. That means precise adjustments in spatial and angular position and reduced sway during the movement of the load.

A first aspect of the present disclosure refers to an apparatus for positioning and orientating a load, the apparatus comprising:
- a support structure movable in a first direction (for instance, an X direction), the support structure establishes an area within which the load can be positioned and orientated;
- a tendon system comprising:
  - at least six winches mounted on the support structure; and
  - at least six tendons, a first end of each of the at least six tendons being connected to a respective one of the at least six winches.

The apparatus further comprises:
- a lifting mechanism mounted on the support structure and movable in a second direction (for instance, a Y direction) which is perpendicular to the first direction, the lifting mechanism comprising a further tendon;
- attachment means whereto the load is attachable to suspend from above, the attachment means being connected to a second end of each of the at least six tendons and to a free end of the further tendon; and,
- a control module being capable of synchronously and independently operating:
  - over the at least six winches so to adjust the free length of and/or tension supported by the tendon connected to the respective winch,
  - over the support structure so as to control its movement in the first direction, and
  - over the lifting mechanism so as to control its movement in the second direction and over the lifting mechanism so as to adjust the free length of and/or tension supported
  - by the further tendon connected to the lifting mechanism;

wherein the control module is configured to translate an instruction regarding the orientation and/or the position of the load in an actuation over the at least six winches, over the lifting mechanism and over the support structure, such that at least 51% of the load is sustained by the lifting mechanism and the load is suspended in a substantially vertical manner.

That is, the apparatus of the disclosure provides individual control for each of the elements of the system. An apparatus according to this aspect of the disclosure provides control of a load in the six degrees of freedom, without swinging across wide workspaces.

The apparatus of the disclosure including a lifting mechanism is advantageous because, since at least 51% of the weight of the load is sustained by the lifting mechanism, the tendon system can be mainly used for positioning and rotating the load instead of sustaining it. As only a fraction of the weight is held by the tendon system, the tendons will break less frequently or tendons without very large tensile strength may be used, resulting in a cost-effective solution. By transferring a variable part of the load from the lifting system to the tendon system, the general stiffness of the tendon system with 6 degrees of freedom is also modulated in function of the task to be carried out.

The movement of the lifting mechanism and the movement of the winches are synchronously and individually controlled by the control module. Once the load is suspended from the further tendon of the lifting mechanism, this further tendon is maintained in a substantially vertical position and sustains at least 51% of the load.

Moreover, appropriate control of the cable lengths allows to position and orientate the load as desired or to describe any prescribed trajectory within the feasible workspace. The tendon tensions may also be adjusted in order to balance or generate appropriate forces and moments between the load and the base support.

In some of embodiments of the disclosure, more than 80% and less than 100% of the weight of the load is sustained by the lifting mechanism. In some these embodiments, the lifting mechanism sustains more than 90% of the weight of the load.

In some embodiments, the tendons system is the master and the lifting mechanism and the support structure "follow" it; that is, the control module is configured to translate an instruction regarding the orientation and/or the position of the load in an actuation over the one or more of the elements of the tendon system first, and then the lifting mechanism and the support structure are actuated. Please note that the instruction over the support structure may include an instruction to not move. This configuration is advantageous since actuation over the tendon system provides control of the translations in the second direction (Y) and in a third direction (Z) which is perpendicular to the first and second directions, and also control of the three rotations (yaw, pitch and roll), and then subsequent actuation over the lifting mechanism provides control to relieve the tendon system of at least 51% or more of the weight of the load. In these embodiments the lifting mechanism can be a gravity compensation system, that is, a passive element.

In some other embodiments, the lifting mechanism is the master and the tendons system and the support structure "follow" it. In these embodiments, the control module is configured to translate an instruction regarding the orientation and/or the position of the load in an actuation over the lifting mechanism first, and then in an actuation over one or more of the elements of the tendon system and in an actuation over the support structure. Please note that the instruction over the support structure may include an instruction not to move. In these embodiments the lifting equipment can be a hoist or any kind of winch with a motor on it and it could also be a weight balancer, a counterweight system or a pantograph.

The lifting mechanism may comprise components or machinery that are well-known in the art for holding and resisting large forces or tensions, such as the force generated by the weight of a heavy load. When the apparatus is used, the lifting mechanism is intended to be attached to at least one attachment point of the load.

The control module also provides stable control of movements and rotations of the load; this way, sway or swinging motions are dampened or reduced. Such sway movements may be due to, for instance, a displaced center of mass of the load causing a moment of force or torque on the load, too abrupt movements on the load generating vibrations or pendulum-like movements, and the presence of wind Each of the at least six winches of the tendon system, which are preferably distributed in pairs, is mounted on the support structure of the apparatus, thereby positioned at a height higher than the height of the load when the apparatus is in use.

Each of the winches of the tendon system preferably comprises a tension and/or length sensor.

The inclusion of sensors in the winches for measuring the tension that a tendon experiences, or the length that a tendon is rolled in the drum of the winch may be particularly helpful for the control and supervision of the tendon system. In some embodiments of the disclosure, the data generated by the sensors is supplied to the software and algorithms of the system so as to, for example, allow or deny particular actions, output a warning or alert, act on the servomotors of the winches or lifting mechanism so as to perform particular actions, among others.

In some embodiments of the disclosure, each of the winches is directly attached to the support structure. In some other embodiments of the disclosure, each of the winches of the tendon system is indirectly attached to the support structure, in which case each of the winches is attached to a support secured to the support structure of the apparatus. In some of these embodiments, the one or more supports are adjustable in position by means of, for example, hydraulic cylinders, pantographs or scissor mechanisms. In some other embodiments, the one or more support may be fixed without means to adjust their position.

Upon receiving the corresponding instruction by the control module, each of the at least six winches may adjust the tension of the tendons, or the free length of the tendons, that is, the length of the tendons between the winch and the attachment point of the tendon to the load, which is connected to it by winding or unwinding a portion of the tendon, thus the free length of each of the at least six tendons is individually modifiable by the respective winch.

In preferred embodiments the attachment means are spatially arranged, when attached to the load, such that the at least six tendons are cross-linked, that is a projection onto a plane defined by the first and second directions of each of the at least six tendons intersects with another one of the projections of the at least six tendons.

In preferred embodiments the apparatus of the disclosure further comprises a three-dimensional attachment member, which is attached to the attachment means, which are distributed over the attachment member in parallel planes.

In other embodiments of the disclosure the apparatus also further comprises a two-dimensional attachment member (such as movable platform, or a working platform), which in turn comprises the attachment means, which are distributed on the attachment member in a same plane.

In these embodiments an object (which is to be moved, positioned and/or orientated) can be suspended from the attachment member by vacuum means, or magnetic means or some other suitable fastening equipment. The configuration of these embodiments may be suitable in those cases in which it may be complex to arrange attachment points on the object, or for simplifying the hoisting operations as the tendons do not have to be detached and attached back again every time a new load is manipulated.

For the sake of clarity, in these embodiments the load positionable and orientable with the apparatus of the disclosure includes anything hanging from the attachments means, that is, the object to be moved and the attachment member. In some embodiments, the instruction regarding the orientation and/or the position of the load is given by a pre-established trajectory; that is, the apparatus is automatically controlled by running trajectories previously programmed.

Or the apparatus of the disclosure can be controlled via a radio controlled device, such as a mechanical or electrical system accepting external input of instructions, for instance, a remote control; in this case, the instruction regarding the orientation and/or the position of the load is given by the orders provided by such radio-controlled device.

In some embodiments of the disclosure each of the winches of the tendon system is connected to a servomotor. The servomotors are configured to act on the winches in order to adjust the tension or the free-length of the tendons so that when the servomotors are manipulated, the tendons of the tendon system will have their tension or free-length modified resulting in a movement or rotation of the load. Further, servomotors may advantageously support external input of instructions allowing the operations to be performed via remote control and/or automatically by running trajectories previously programmed. The latter case, no intervention of an operator is needed.

Such external input support may also enable the use of software and algorithms especially programmed for the control of an apparatus according to another aspect of the disclosure. The software and/or algorithms may include the logic necessary to simplify the manipulation of the apparatus and avoid the collision and interference of tendons.

In the present disclosure all winches are located above its workspace, gravity being used to keep the cables taut; this configuration is called crane-like configuration. No cable clutters the lower part of the workspace to avoid cable collisions.

Alternatively, in some embodiments of the disclosure the attachment means are located at a respective second end of the at least six tendons and to the free end of the further tendon. In these embodiments the attachment means may comprise ringbolts, swivel eyebolts and/or safety hooks, and the object (which is to be moved, positioned and/or orientated) is directly attached to the attachments means; that is, the load only comprises the object to be moved.

When the apparatus is used, the attachment means are attached to one of a plurality of attachment points arranged on the load (including the object to be moved and in some embodiments the attachment member) that is to be manipulated and orientated by the apparatus.

The control module may be additionally configured to define (or establish) a plurality of attachment points on the load which is to be manipulated by the apparatus.

The plurality of attachment points at least includes as many attachment points as tendons are in the tendon system, that so the tendon system is attachable to the load or attachment member at one attachment point that no other tendon of the tendon system is attached to. In addition to the plurality of attachment points, the load to be manipulated by the apparatus includes at least an additional attachment point used by the lifting mechanism. Therefore, the load comprises as many attachment points as there are tendons in the tendon system plus as many attachment points as required by the lifting mechanism.

In some embodiments of the disclosure the tendon system of the apparatus comprises:
  at least eight winches; and
  at least eight tendons, each of the at least eight tendons being connected to a respective one of the at least eight winches.

In such embodiments, operation of the apparatus may result simpler and more straightforward as the eight winches may be attached to the support structure, directly or indirectly, in a symmetrical arrangement such as to form, for example, a rectangular geometry. Positioning and orienting tasks may result simpler for the personnel in charge when tendons and winches are arranged substantially symmetrical. It is also convenient for manipulating loads featuring geometries similar to rectangular or square prisms that have eight well-defined corners or vertices which the tendons of the tendon system may attach to when the apparatus is in use, although in some other embodiments of the disclosure, loads featuring such geometries are positioned and oriented with a tendon system comprising six tendons and six winches.

In some embodiments of the disclosure, the support structure comprises a moving structure. In some of these embodiments, the moving structure is a trolley or a movable beam. The lifting mechanism may be connected to the trolley or movable beam so that the mechanism may move owing to the motion of the trolley or movable beam. In addition to the positioning capability of the tendon system, the moving structure may be advantageously used to move and position the load as well, particularly for moving the load relatively long distances, so that the final and precise position adjustments are performed by the tendon system.

In some embodiments of the disclosure, the support structure comprises one, two or more beams. In some other embodiments, the support structure comprises one, two or more girders. In some embodiments of the disclosure, the support structure may be configured to be mounted on the rails of a crane system.

In some embodiments the tendon system comprises at least six tendon guiding means, each of the at least six tendons is routed from the respective winch to a respective one of the at least six tendon guiding means, and each of the at least six tendon guiding means is configured to guide the respective tendon towards a respective direction.

In some embodiments of the disclosure, each of the tendons of the tendon system is guided towards the load to be manipulated directly from the respective winch. In some other embodiments of the disclosure, the tendon system comprises as many tendon guiding means as tendons in the system, and each of the tendons is routed from respective winch to one of the tendon guiding means which, in turn, guides the tendon towards the load. The use of tendon guiding means may be advantageous to avoid tendons interfering or colliding with parts of the apparatus, for instance with the support structure, or with other tendons as well. In some embodiments, the tendon guiding means are attached to the winches. In some other embodiments, the tendon guiding means are attached to the support structure, or to one or more additional structures that are secured to the support structure.

The tendon system according to an aspect of the disclosure is not limited to winches, and, thus, another similar tools or instruments known in the art may be used instead like, for example, windlasses.

Another aspect of the disclosure relates to method for positioning and orienting a load, comprising:
attaching the load to attachment means of an apparatus for positioning and orientating a load, the apparatus comprising a support structure, and a tendon system and a lifting mechanism mounted on the support structure; the attachment means being connected to at least six tendons of the tendon system, each of the at least six tendons being connected to a respective one of at least six winches of the tendon system, and to the lifting mechanism;
suspending the load from a free end of a further tendon of the lifting mechanism;
translating an instruction regarding the orientation and/or the position of the load in an actuation over the at least six winches, over the lifting mechanism and over the support structure such that at least 51% of the load is sustained by the lifting mechanism and the load is suspended in a substantially vertical manner by synchronously and independently operating:
over the at least six winches to adjust the free length of and/or tension supported by the tendon connected to the respective winch, and
over the support structure so as to control its movement in the first direction, and;
over the lifting mechanism so as to control its movement in the second direction and over the lifting mechanism so as to adjust the free length of and/or tension supported by the further tendon connected to the lifting mechanism, providing control of the load in the six degrees of freedom.

In some of embodiments of the disclosure, more than 80% and less than 100% of the weight of the load is sustained by the lifting mechanism. In some embodiments, the lifting mechanism sustains more than 90% of the weight of the load.

In a preferred embodiment the at least six tendons are attached to the load or attachment member in a crossed tendon configuration, implying that a projection onto a plane defined by the first and second directions of each of the at least six tendons intersects with another one of the projections of the at least six tendons.

This cross-linked tendon configuration is achieved as follows:
establishing first and second areas on the load or attachment member, the first and second areas being, respectively, one of:
top and bottom surfaces of the load or attachment member, prior to manipulating the load when the load is on a support surface; and
inner and outer areas of a top surface or a bottom surface of the load or attachment member, prior to manipulating the load when the load is on a support surface;
establishing a plurality of attachment points on the load for attaching the tendon system including a first subset of at least two attachment points on the first area, and a second subset of at least two attachment points on the second area;
attaching the at least six tendons to the attachment points of the load or attachment member as follows:
(a) attaching a first tendon of the tendon system to a selected point of the first subset of attachment points, wherein a distance between a guiding point and a selected point of the first subset is greater than at least another distance between the respective guiding point and a point of the first subset different from the selected point;
(b) attaching a tendon of the tendon system not yet attached to the load and having the respective guiding point closest to the guiding point for the previously attached tendon to a selected point of a subset alternate to the subset which the attachment point for the previous attached tendon belongs to; wherein the selected point is not a point of the respective subset that is the closest to the attachment point for the previous attached tendon; the selected point is not the attachment point for any other tendon already attached to the load; and a distance between the respective guiding point and the selected point is greater than at least another distance between the respective guiding point and a point of the same subset different from the selected point; and (c) repeating step (b) until the at least six tendons of the tendon system are attached to an attachment point of the first or second subset.

The method comprising the steps for attaching the tendons to a load or attachment member provides positioning and orienting capabilities of the load throughout a large volume of the workspace with no interference between tendons. In some of these embodiments, the tendons are attached to two surfaces of the load such that the attachment points lie in at least two disjoint planes and are not coplanar. In some other embodiments of the disclosure, the tendons are attached to a surface of the load or attachment member in a plurality of attachment points, the plurality featuring at least two subsets of attachment points: an at least first subset in an inner area of the surface, and an at least second subset in an outer area of the surface. In some of these embodiments, the inner area of the surface comprises the geometrical center of the surface, and the outer area surrounds the inner area and comprises the perimeter of the surface.

In some embodiments of the disclosure, the tendon system comprises as many tendon guiding means as tendons in the tendon system, and each of the at least six tendons is guided towards the load from respective guiding means, wherein each of the tendons is routed from its respective winch to its respective guiding means; a guiding point may be defined for each of the tendons where the tendon leaves the respective guiding means towards the load. In some of these embodiments of the disclosure, each of the guiding means is in the vicinity of a winch; in some cases, a guiding means may be already incorporated to the winch. In some other embodiments, each of the guiding means may be attached to the support structure directly, or indirectly like, for instance, being attached to another structures secured to the support structure.

The use of tendon guiding means may be advantageous to avoid collisions between tendons and structures, platforms or the like, including parts of the apparatus corresponding to another aspect of the disclosure, for instance the support structure of such apparatus. Further, it may be helpful to avoid collision between the tendons. The tendon guiding means may also reduce frictions suffered by the tendons during the operation of the apparatus, particularly while the load is being positioned and rotated. Some non-limiting examples of tendon guiding means are, for instance, sheaves or pulleys.

The method preferably further comprises the step of first actuating over the tendon system, that is, the instruction regarding the orientation and/or the position of the load is translated firstly in an actuation over the at least six winches and subsequently over the lifting mechanism and over the support structure.

Or the method may comprise the step of first actuating over the lifting mechanism, whenever the lifting mechanism is the master, to lengthen and/or shorten a length of the lifting mechanism or of a component thereof so as to move the load vertically, and then over the tendon system and over the support structure.

The lifting mechanism may wind or unwind part of the tendon that is, for instance, rolled around a drum of the mechanism, and vary the height or vertical position of the load attached to the mechanism. In some embodiments of the disclosure, the means for changing the free length may be adapted for remote control thereof, for instance by a mechanical or electrical system accepting external input of instructions. In other embodiments of the disclosure, the means for changing the free length are adapted automatically by running trajectories previously programmed.

In some embodiments of the disclosure, the location of the winches—and guiding means, if any—of the tendon system is at a height higher than the load during its manipulations, which is not only advantageous for keeping the tendons in tension due to part of the weight sustained, but also for keeping a large volume of the workspace free of obstacles. In some of these embodiments, a volume of the workspace that is below the minimum height of the load, defined by the point or points of the load which are at the lowest height, may be practically free of elements of the apparatus and, hence, almost no interferences with the apparatus are produced during the positioning and orienting of a load. For example, this is particularly advantageous for stacking up containers, or assembling a wing or a turbine of an airplane when the only element present in that part of the workspace is the fuselage of the airplane.

The different aspects and embodiments of the disclosure defined in the foregoing can be combined with one another, as long as they are compatible with each other.

Additional advantages and features of the disclosure will become apparent from the detailed description that follows.

BRIEF DESCRIPTION OF THE DRAWINGS

To complete the description and in order to provide for a better understanding of the disclosure, a set of drawings is provided. Said drawings form an integral part of the description and illustrate an embodiment of the disclosure, which should not be interpreted as restricting the scope of the disclosure, but just as an example of how the disclosure can be carried out. The drawings comprise the following figures.

DETAILED DESCRIPTION OF THE DRAWINGS

The following description is not to be taken in a limiting sense but is given solely for the purpose of describing the broad principles of the disclosure. Embodiments of the disclosure will be now described by way of example, with reference to the above-mentioned drawings showing elements and results according to the disclosure.

Figure 1:
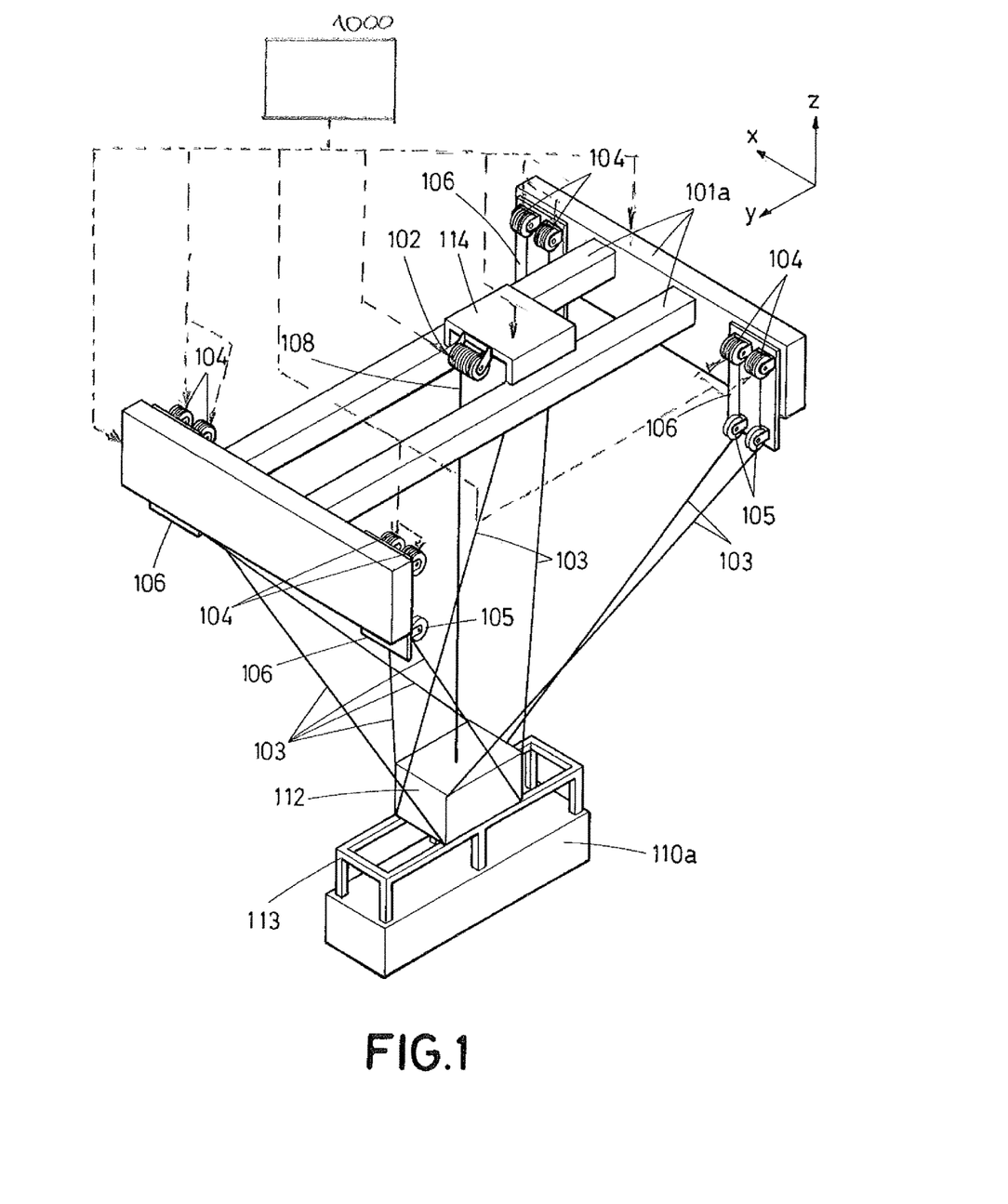
FIG. 1 is a schematic perspective view of a tendon-driven manipulator in accordance with an exemplary embodiment of the present disclosure.

FIG. 1 shows a perspective view of first exemplary embodiment of the tendon-driven manipulator of the disclosure. A support structure 101*a* includes two beams arranged in parallel, between two girders, the two girders being also arranged in parallel and perpendicular to the beams. The support structure 101a is mounted on top of a crane's framework (not shown in the Figure for clarity purposes); the support structure 101a is provided with moving capabilities along the longitudinal direction, X direction in FIG. 1, of the two girders.

A lifting mechanism 102 is attached to a moving structure in the form of a trolley 114, and connected to the support structure 101a. The trolley 114 is movable along a longitudinal axis of the two beams (Y direction in FIG. 1) by means of, for example, a moving mechanism going through some rails affixed to the beams.

The apparatus of the disclosure further comprises attachment means whereto the load is attachable to suspend from above.

In the embodiment shown in FIG. 1, the apparatus further comprises a movable platform 112 as attachment member which comprises the attachment means. The cable 108 is attached to the movable platform 112, which is in turn directly or indirectly attached to an object 110a, and is also connected to the lifting mechanism 102. In some other embodiments, this cable 108 may be a chain, a rope, or any elongated element featuring a tensile strength sufficient to sustain the weight of the load that is supported by the lifting mechanism 102.

In this case the object 110a is attached to the movable platform 112 by means of an intermediate support 113 located between the object 110a and the movable platform 112. The eight tendons 103 of the tendon system are attached to the eight attachment points of the movable platform 112, which in this case are the vertices—or positions relatively close to the vertices—of the movable platform; the object 110a can be thus moved and rotated following the motions of the movable platform 112. The use of an movable platform 112 or any other attachment member is advantageous when it is difficult to arrange attachment points on the object due to, for example, fragile or irregular surfaces. This movable platform 112 or attachment member may also reduce the time it takes to change from one object to another as the tendons may be already attached to the attachment member, which avoids detaching tendons from an object and attaching them to another object.

Though not shown, it is also possible that the disclosure, the object 110a is directly connected to the attachment member.

In the embodiment of FIG. 1, the lifting mechanism 102 comprises a hoist which is configured to wind and unwind the cable 108 in a drum of the hoist. By winding and unwinding a free length of the cable 108, that is, the length between the point where cable 108 is attached to the, movable platform 112 and the hoist, the object 110a is moved along the longitudinal axis of the cable 108, which corresponds to a vertical direction (Z direction in FIG. 1). Thus, in such case, the object 110a is moved vertically, namely its height is varied.

The apparatus of the disclosure further comprises a tendon system comprising eight tendons 103, each of the eight tendons 103 being connected to one of the eight winches 104. As it will be explained below, each of the winches is individually controlled by a control module 1000 to regulate the lengths and/or tensions of the tendons by means of feedback control; that is, all the tendons are independently actuatable.

In the preferred embodiments, the winches 104 are sensorized, that is, they comprise sensors that measure the tension or free-length in the tendons or the length between a winch and the second end, for example.

The tendons 103 are routed from respective winches 104 to respective guiding means 105, and from the guiding means 105 are guided towards the load, that is, towards the movable platform 112, that holds the object 110a with the intermediate support 113. In the embodiment of the apparatus shown in FIG. 1 each pairs of winches 104 with their respective pairs of guiding means 105 are attached to a respective panel 106, which is secured to girders of the support structure 101a. It is also possible that the panels are secured to the beams or other parts of the support structure. Albeit it may be preferable to arrange winches and/or guiding means in pairs, that is, two of each being in relative proximity, in some embodiments of the disclosure, the winches and/or their guiding means are each individually attached to a panel 106 or any other structure to which winches and/or guiding means may be attached to.

It is also possible (cf. FIG. 3) that some or all of the winches 104 and/or some or all of the guiding means 105 are directly attached to the support structure 101a, and some other winches and/or guiding means are attached to a structure such as the panels 106, which are connected to the support structure.

As schematically shown in FIG. 1, the winches 104 comprise guiding means 105. A guiding point may be defined for each tendon 103 of the tendon system at a position where the tendon changes its direction and is substantially oriented towards the load. In this embodiment, a guiding point for respective tendons is defined at respective guiding means 105, since these are the locations where the tendons 103 are reoriented towards the load. In some embodiments of the disclosure in which the tendon system may not include guiding means 105, respective guiding points may be defined at respective winches 104 since the winches may already orient the tendons 103 towards the load. Guiding means 105, in this particular example, are sheaves comprising a means for rotating in order to vary the direction that the sheaves face as the object 110a is being positioned and oriented.

As previously outlined, upon receiving the corresponding instruction by the control module, each of the winches 104 may adjust the tension or free-length of the respective tendon—by winding and unwinding the tendon in the drum of the winch—and, consequently, changing the force applied to the load. As a result, the load, and therefore, the object 110a may be moved and rotated. When the tensions of some or all of the tendons of the tendon system are properly modified, the load may be positioned and oriented in a controlled and safe manner. The tensions or free-lengths may also be adjusted so as to dampen the swinging motions of the load, both when the part is being moved and when it is not.

Additionally, this control module is also operable to actuate over the support structure 101a so as to control its movement in the longitudinal direction of the girders, or X direction, and over the lifting mechanism 102 so as to control its movement in the Z direction and so as to adjust the free length of and/or tension supported by the cable 108 of the lifting mechanism.

This control module individually and synchronously actuates over the aforementioned elements so that the tendon system supports a fraction of the weight needed to have all their tendons under tension, and the rest is supported by the lifting mechanism a majority of the weight; in other words, at least 51% of the weight of the load (in this case the sum of the object 110a, the movable platform 112 and the intermediate support 113) is sustained by the lifting mechanism 102. Preferably, the lifting mechanism 102 sustains more than 80% and less than 100% of the weight of the load.

In this preferred embodiment shown in FIG. 1, the tendon system acts as master and the lifting mechanism and the support structure follow it according to the instructions given by the control module 1000, based on pre-programmed trajectories or based on the inputs of a user over a remote control device which wishes to move and orientate the load.

In this embodiment:

The tendon system provides movement of the load as follows: Y-Z translations and all rotations—yaw, pitch and roll—, combined with the support structure (the gantry), which provides movement only in the X direction.

The trolley 114 provides movement in the Y direction.

The lifting mechanism 102 (in this case a hoist) provides movement in the Z direction.

The tendon system is thus responsible for the movements. The trolley is considered as a slave and so is the hoist. The Y position of the load is given by the tendon system and the trolley 114 as to copy this position. The hoist relieves the tendon system from at least 51% of the load; whatever the Z position of the load is, the control modules instructs the hoist to apply a constant force on the load so as to sustain at least 51% of its weight.

Figure 2:
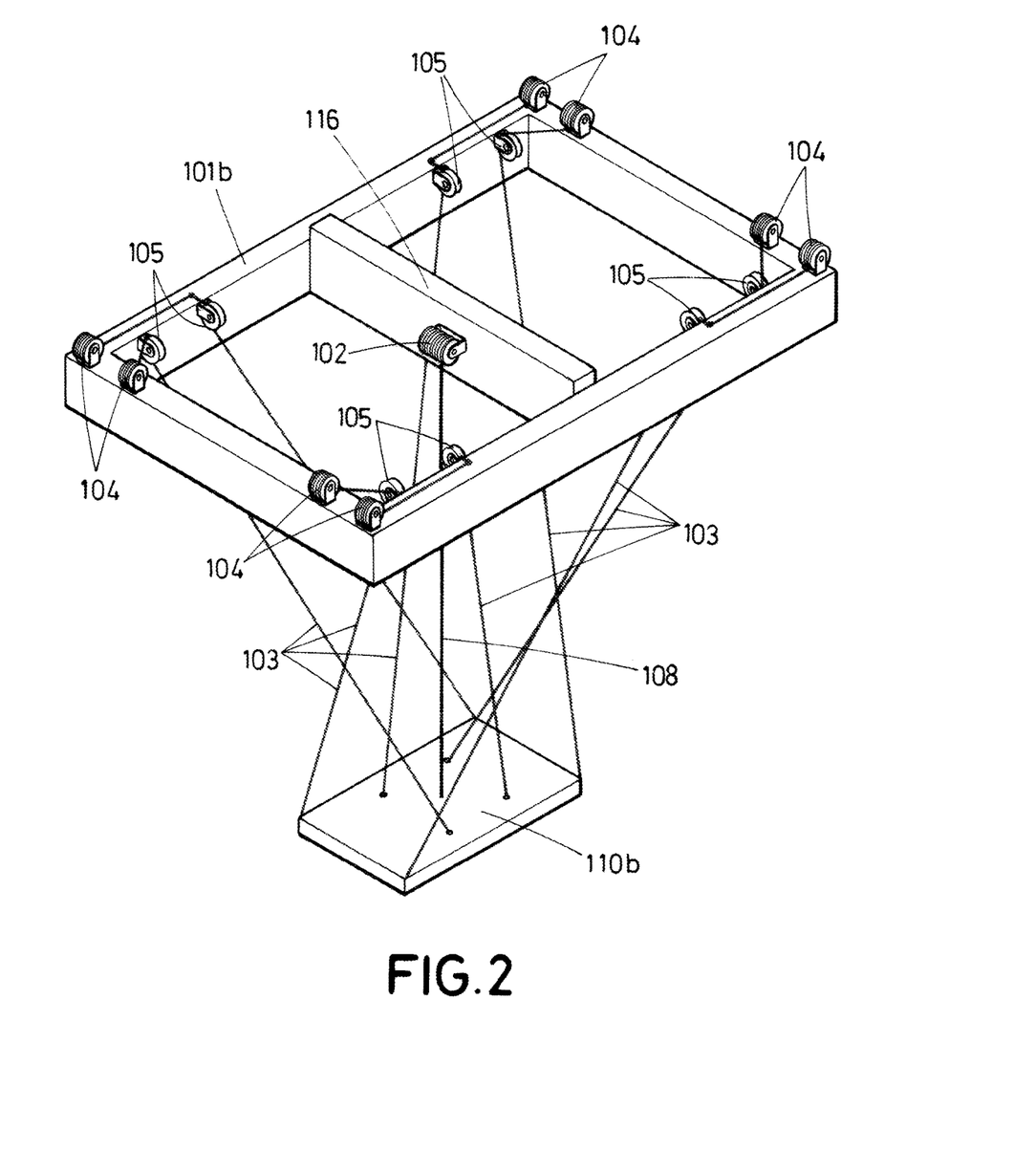
FIG. 2 is a schematic perspective view of a tendon-driven manipulator in accordance with another exemplary embodiment of the present disclosure.

Another exemplary embodiment of the apparatus of the disclosure is shown in FIG. 2. The apparatus comprises a support structure 101b, which comprises a plurality of girders in a rectangular layout. The lifting mechanism 102 is connected to the support structure 101b by being attached to a movable beam 116, said beam being connected to the support structure 101b. The movable beam 116 may move along a direction perpendicular to its longitudinal axis. The cable 108 is connected to the lifting mechanism 102. The object 110b to be moved and/or orientated is provided with at least one attachment point for the lifting mechanism 102. In this case the load is just the object 110b. The at least one attachment point is preferably located on a top surface of the object 110b, and substantially proximate to the projection of the center of mass of the load on said surface in order to reduce moments of force resulting in undesired rotations or swinging motions.

In FIG. 2, the tendon system also comprises eight tendons 103, eight winches 104 and eight guiding means 105. The eight winches 104 are secured to the support structure 101b, and the eight guiding means 105 are also secured to the support structure 101b, slightly spaced-apart from respective winches. The guiding means 105 are arranged in a substantially symmetrical layout forming a rectangular geometry. In some embodiments of the disclosure, there is no symmetry between the guiding means 105 (for example, in the embodiment of FIG. 1), and geometries formed may be different from a rectangle as well, even though forming substantially regular geometries and maintaining a symmetry are preferable in order to simplify the manipulation of loads. The shapes of the loads to be moved may be considered for positioning the guiding means so as to maximize the potential workspace.

In the embodiment of FIG. 2, the attachment means are ringbolts (not shown in the Figure), which are attached to the respective second end of the at least eight tendons 103 (the first end of each tendon 103 being wound over the respective winch 104) and to the free end of the cable 108.

In this embodiment all the tendons 103 are attached by means of the ringbolts to attachment points which are distributed on a same surface of the object 110b. Albeit the object 110b features a thickness, it is substantially planar, and arranging the eight attachment points, in addition to the at least one attachment point for the lifting mechanism 102, on the same surface may be convenient. In this case, preferably a first subset of attachment points is arranged on an inner area of the top surface of the object 110b, and a second subset of attachment points is arranged on an outer area—the area surrounding the inner area of said top surface.

The shape characteristics of the load or object 110b may correspond to, for instance, those of a sheet of metal.

Figure 3:
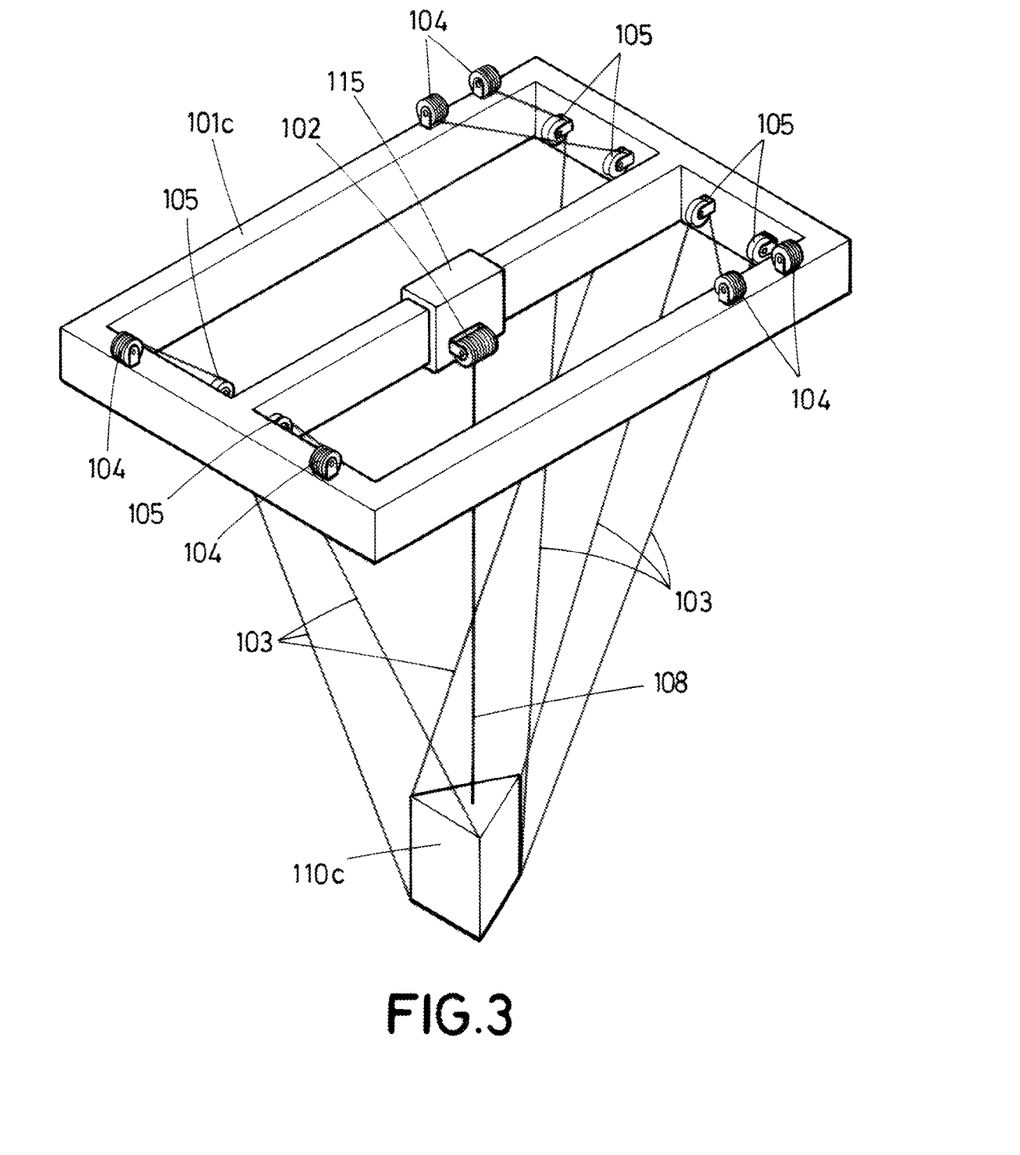
FIG. 3 is a schematic perspective view of a tendon-driven manipulator in accordance with another exemplary embodiment of the present disclosure.

Another possible embodiment in accordance with the disclosure is shown in FIG. 3. The support structure 101c includes a plurality of girders. The girders are arranged so as to form two rectangular layouts sharing a girder in the middle. The lifting mechanism 102 is secured to a moving structure 115 which, in this case, surrounds the girder in the middle. The moving structure 115 may move along the surrounded girder and, consequently, the lifting mechanism 102 may be moved.

In the embodiment of FIG. 3, these attachment means are six swivel eyebolts (not shown in the Figure), each swivel eyebolt attached to the respective second end of the at least six tendons 103 and to the free end of the further tendon 108.

In the exemplary embodiment shown in FIG. 3, the object 110c has a shape of a triangular prims with six vertices. Again, in this case the load is just the object 110c. Attachment points on the object 110c are arranged in each of the vertices, or in positions substantially close to each of the vertices which may support greater tensions than the vertices. The swivel eyebolts (not shown) at the second end of the tendons 103 and at the free end of the cable 108 are attached to these attachment points on the object 110c. The embodiment of the apparatus shown in FIG. 3 with six tendons is particularly suitable for moving and rotating a load with six vertices.

In this embodiment the lifting mechanism 102 acts as master, the tendon system and the moving structure 115 being synchronously and independently actuated by the control module to move the object 110c, for example, from a dock or loading bay to a trailer or an area for the assembly of vehicles, machines or equipment, and the tendon system may position and orient the load or object 110c with precision in the final stages of the load manipulation.

Using the lifting mechanism as master may simplify the control instructions for moving the load as only one length—or free length—must be modified, whereas performing the same action with the tendon system might require acting on the length of all the tendons of the tendon system. Further, elevating the load by the tendon system may lead to an increase of the tensions experienced by the tendons and, thus, increasing the chances of failure due to breakage of the tendons.

Figure 4A:
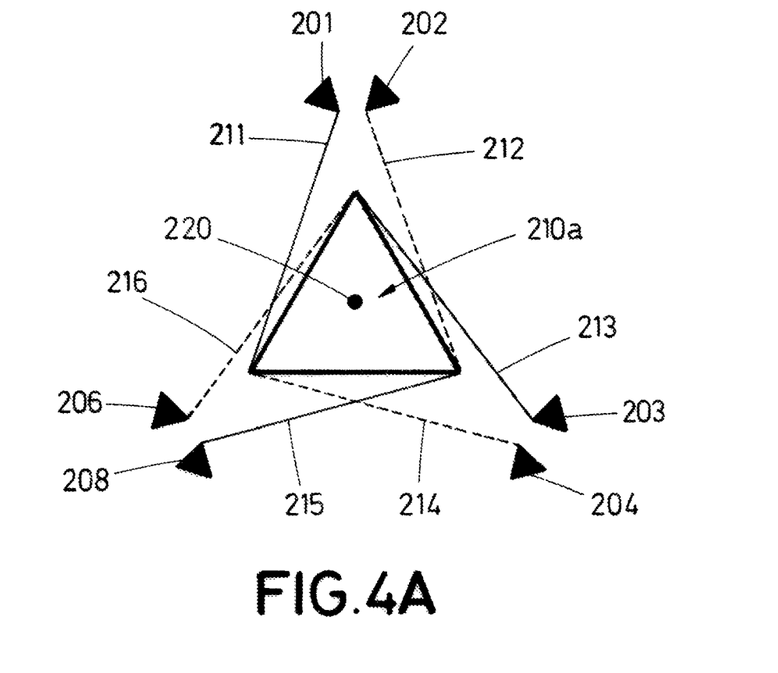
FIGS. 4A and 4B partially show, in top and perspective views, a method to attach tendons of a tendon system in accordance with an exemplary embodiment of the present disclosure similar to FIG. 3.
Figure 4B:
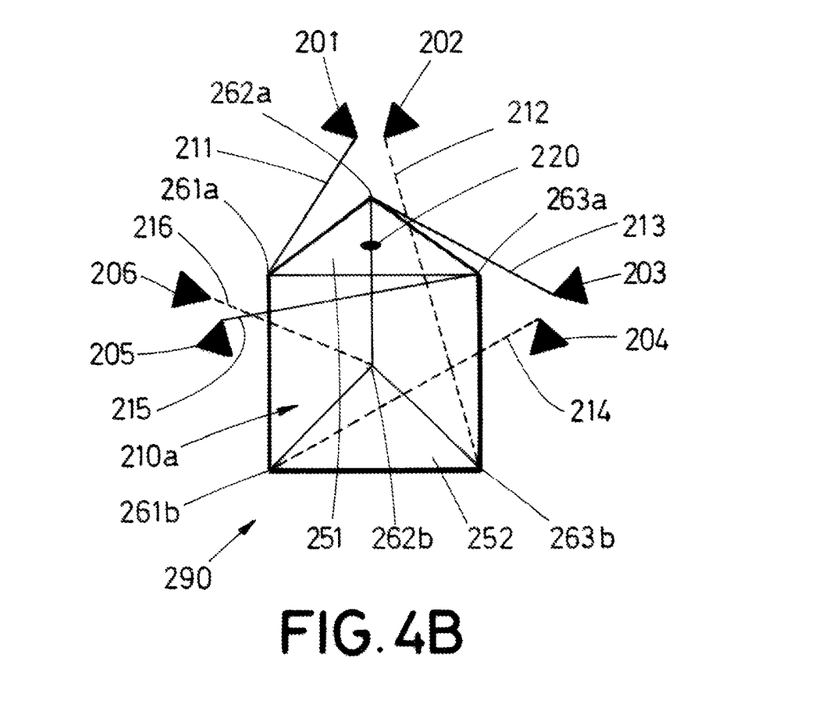

A schematic representation of tendons being attached to an object in accordance with an aspect of the disclosure is shown in top and perspective views in FIGS. 4A and 4B, respectively. A manipulated object 210a has the shape of a triangular prism comprising six vertices, particularly suitable for arranging attachment points thereon. A top surface 251 and a bottom surface 252 may be defined on the object 210a when it is resting on a support surface 290 prior to the manipulation of the object. In some embodiments, the support surface 290 may be the ground. In some other embodiments, the support surface 290 may be a trailer of a truck, a container (for example, another container acting as the load may be on top of the container acting as the support surface), among others. Another attachment point 220 is further arranged on the top surface 251 so that the manipulated object 210*a* is suspended from the lifting mechanism, which sustains at least 51% of its weight. The top surface 251 comprises a first subset of attachment points 261*a*, 262*a*, and 263*a* for the tendon system, and the bottom surface 252 comprises a second subset of attachment points 261*b*, 262*b*, and 263*b* for the tendon system.

The tendon system comprises six tendons 211-216, each of the tendons having respective guiding points 201-206. The tendon system further comprises six winches which are not represented in FIGS. 4A and 4B. For illustrative purposes only, tendons 212, 214, and 216 are represented with broken lines indicating that are attached to attachment points on the lower surface 252, the material and properties of the tendons is similar to or same than tendons 211, 213, 215 illustrated with solid lines, meaning that they are attached to points of the top surface 251. In some embodiments of the disclosure, the guiding points 201-206 are defined on respective guiding means of the tendon system. In some other embodiments of the disclosure, the guiding points 201-206 are defined on respective winches of the tendon system.

Any of the tendons 211-216 may be the first tendon in the method for attaching the tendons to the object 210*a*. Considering tendon 211 as the first one, the tendon is attached to a selected point 261*a* of the first subset as the distance between the respective guiding point 201 and the selected point 261*a* is greater than at least another distance between the respective guiding point 201 and a point of the first subset different from the selected point 261*a*: it is greater than, for example, the distance between guiding point 201 and point 262*a*.

The next tendon that is to be attached to object 210*a* is tendon 212 because its respective guiding point 202 is the closest to the guiding point 201 corresponding to the previously attached tendon 211. As tendon 211 was attached to a point of the first subset, tendon 212 is to be attached to a point of the subset alternate to the first subset, that is, the second subset of attachment points. The selected point of tendon 212 is 263*b* as such point is not the closest point of the second subset that is the closest to point 261*a* (the closest point is 261*b* which, in this embodiment, shares an edge of object 210*a* with point 261*a*), the selected point 263*b* is not an attachment point for any other tendon already attached, and the distance between guiding point 202 and selected point 263*b* is greater than the distance between guiding point 202 and one of points 261*b* and 262*b* (points of the second subset different from selected point 263*b*), which in this case is at least the distance to point 262*b*.

The order in which the other tendons are attached to object 210*a* is: tendon 213, tendon 214, tendon 215, and tendon 216, as each has their respective guiding points 203-206 closest to the previously attached tendon—guiding point 203 is the closest to guiding point 202, guiding point 204 is the closest to guiding point 203, etc.—The tendons alternatively attach to points of the first subset and second subset following the same criteria described before, thus tendon 213 is attached to selected point 262*a*, tendon 214 is attached to selected point 261*b*, tendon 215 is attached to selected point 263*a*, and tendon 216 is attached to selected point 262*b*.

In fact, the first tendon 211 that was attached to object 210*a* could have been attached to point 263*a* as it would have met all the criteria as well, resulting in other selected points for the other tendons; this may be the case in some embodiments of the disclosure. The first tendon 211 could also have been attached to a selected point of the second subset instead of the first subset following the same pattern.

Thus, in some embodiments of the disclosure, the method results in a different, but similar, configuration of tendons being attached to the object 210*a*. The tendon arrangement shown in FIGS. 4A and 4B may be, for instance, applied to the embodiment of FIG. 3.

Figure 5A:
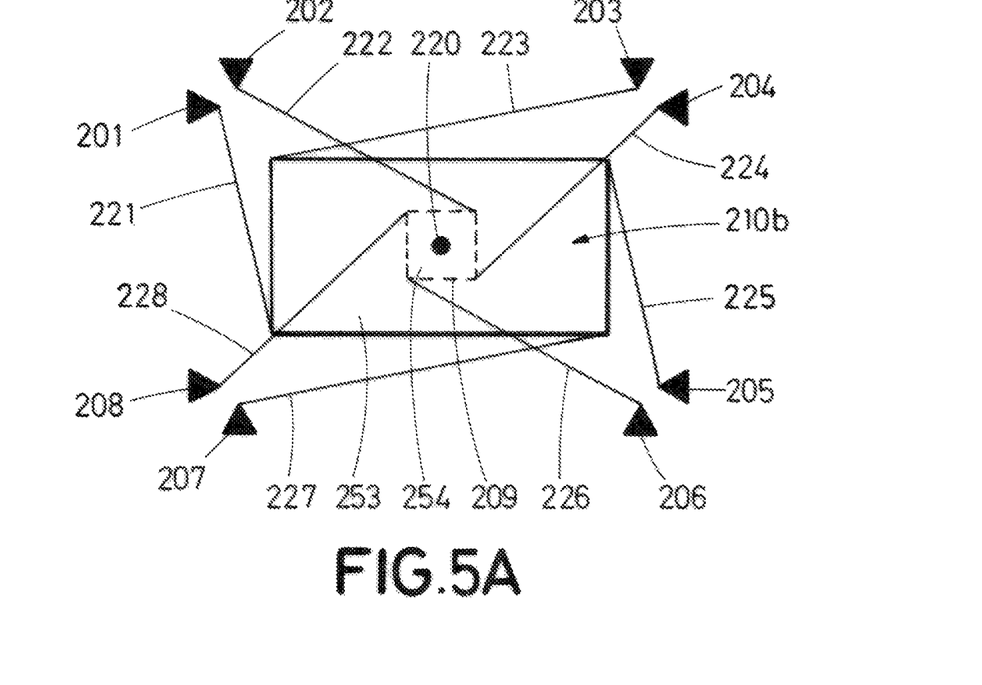
FIGS. 5A and 5B partially show, in top and perspective views, a method to attach tendons of a tendon system in accordance with an exemplary embodiment of the present disclosure similar to FIG. 2.
Figure 5B:
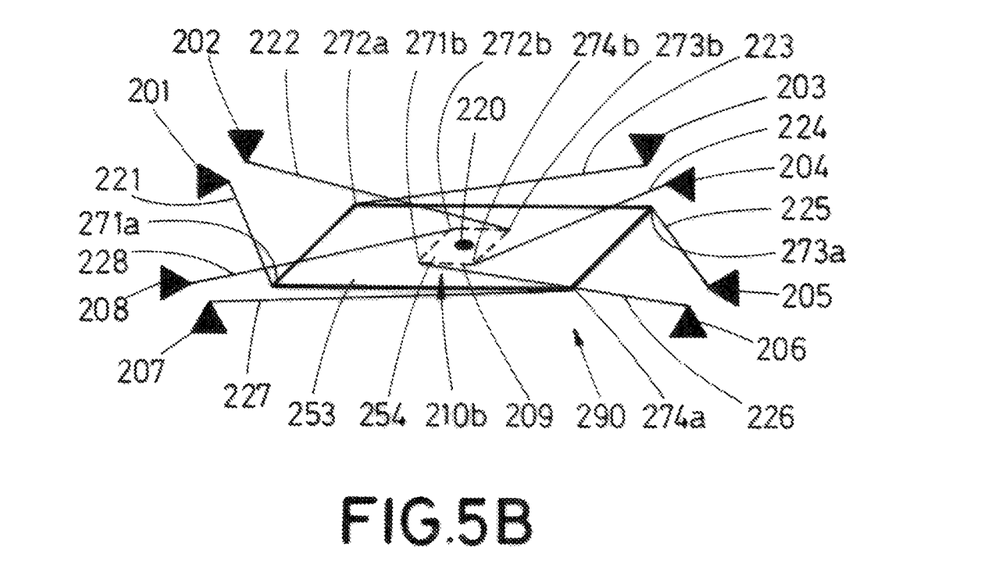

FIGS. 5A and 5B show, in top and perspective views respectively, the arrangement of tendons in accordance with an exemplary embodiment of the disclosure. An object 210*b* is to be manipulated by a tendon system including tendons 221-228, each of the tendons having defined respective guiding points 201-208. The object 210*b* comprises six sides but is substantially planar, namely the thickness of the object is relatively small. In such embodiments, the tendons 221-228 are preferably attached to a same surface of the object. Particularly, a top surface may be defined on the object 210*b* when it is about to be manipulated and is still on a support surface 290. The top surface comprises at least one attachment point 220 for a lifting mechanism, preferably as close as possible to the projection of the center of mass of the object 210*b* on said surface so as to reduce a torque generated by a displaced center of mass.

Further, an inner area 254 and an outer area 253 may be defined on the top surface. The outer area 253 comprises a first subset of attachment points 271*a*, 272*a*, 273*a*, and 274*a*, at the vertices, or positions substantially proximate thereto, of the outer perimeter of the outer area 253. The inner area 254 comprises a second subset of attachment points 271*b*, 272*b*, 273*b*, and 274*b*, at the vertices of the polygon 209 (represented with broken lines for illustrative purposes only). In this embodiment, polygon 209 may establish the inner perimeter of the outer area 253, thus the outer area surrounds entirely the inner area 254. The definition of the inner area 254 and the outer area 253 is rather arbitrary and, in fact, the attachment points corresponding to the inner area may not be arranged around a polygon such as polygon 209, which obviously is defined in an arbitrary manner as well. The inner area represents a part of the surface on which the attachment points are closer to the center than attachment points on the outer area, which may be located at the vertices of the top surface, for example. Thus, the inner and outer areas may be represented with many other geometries, shapes and dimensions.

If tendon 221 is taken as the first tendon to be attached to object 210*b*, even though any of tendons 222-228 could be used instead, the attachment point is selected point 271*a* of the first subset of attachment points—in this example, the attachment points being arranged on the outer area 253—as the distance between respective guiding point 201 and point 271*a* is greater than at least another distance between guiding point 201 and another point of the first subset (point 272*a*) and smaller than at least another distance between guiding point 201 and another point of the first subset (point 273*a* or point 274*a*). In some other embodiments of the disclosure, instead of point 271*a*, the selected point could be point 273*a* as it meets the same requirements. And in some other embodiments of the disclosure, the first tendon is attached to a selected point of the second subset of attachment points following the same procedure, instead of a selected point of the first subset.

As guiding point 202, corresponding to not yet attached tendon 222, is the closest to guiding point 201 corresponding to the tendon attached in the previous step of the method, the tendon 222 is attached next to a selected point of the subset alternate to the selected point 271*a* of previously attached tendon 221. The selected point of tendon 222 is point 274*b*, which is not used by any other already-attached tendon, is not a point of the second subset that is the closest to selected point 271a of the first subset (the closest is point 271b), and the distance between respective guiding point 202 and the selected point 274b is greater than at least another distance between respective guiding point 202 and another point of the second subset (point 272b) and smaller than at least another distance between respective guiding point 202 and another point of the second subset (point 273b).

Following this procedure, the other tendons of the tendon system are attached to the object 210b such that, at every step, the tendon with the guiding point closest to the guiding point of the previously attached tendon is selected, and each tendon is attached to the a point of a subset that is the alternate to the subset the attachment point of the previously attached tendon belongs to. In this manner, tendon 223 is attached to point 272a, tendon 224 is attached to point 273b, tendon 225 is attached to point 273a, tendon 226 is attached to point 271b, tendon 227 is attached to point 274a, and tendon 228 is attached to point 272b. In some embodiments of the disclosure, applying the same method results in a different, but similar, configuration of tendons being attached to the object 210a since, for instance, the first tendon has two possible points (in the first subset) to be attached to, and could also be attached to two possible points of the second subset; the definition of the first tendon being attached to a point of the first subset instead of the second subset is arbitrary. The tendon arrangement shown in FIGS. 5A and 5B may be, for instance, applied to the embodiment of FIG. 2.

Figure 6A:
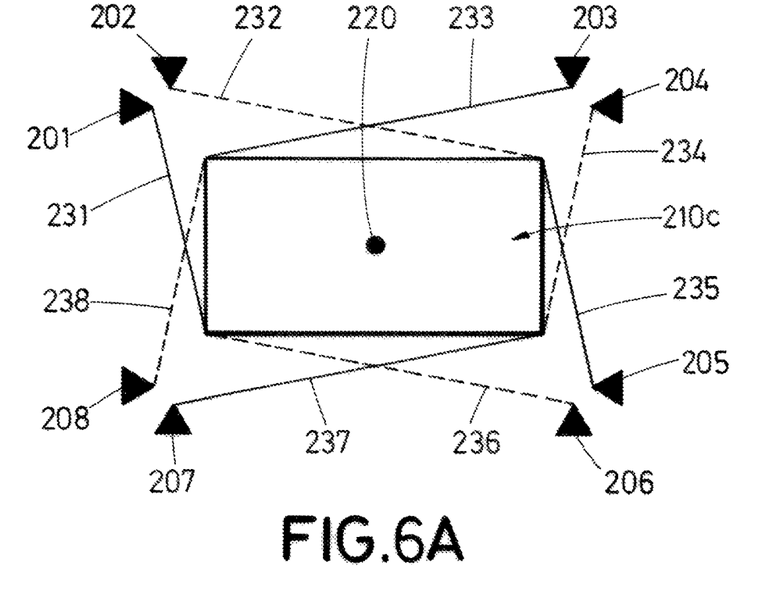
FIGS. 6A and 6B partially show, in top and perspective views, a method to attach tendons of a tendon system in accordance with an exemplary embodiment of the present disclosure similar to FIG. 1.
Figure 6B:
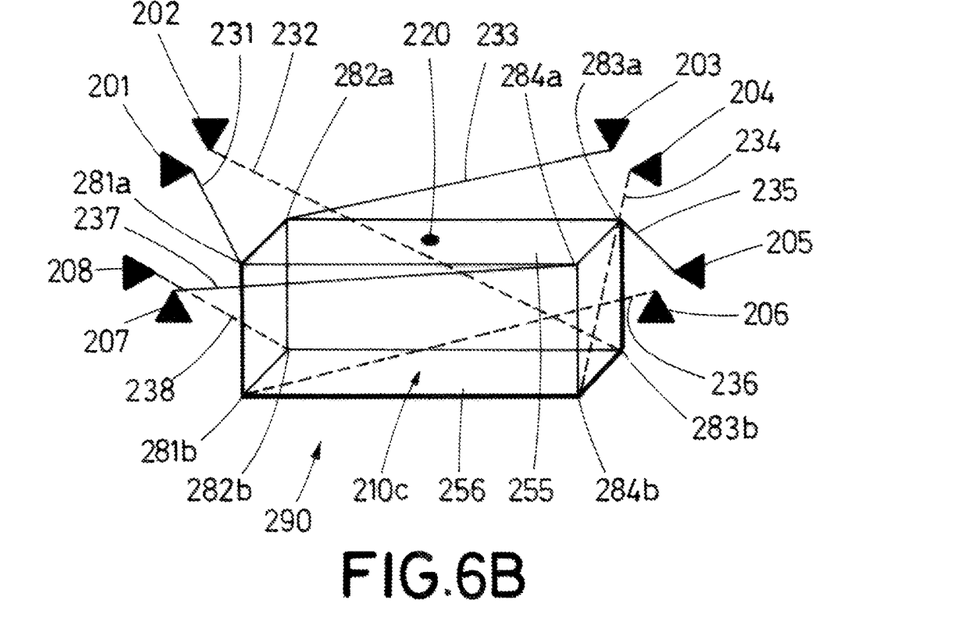

Represented in FIGS. 6A and 6B is object 210c, in top and perspective views, showing a method for the attachment of tendons 231-238 to said object 210c. A top surface 255 and a bottom surface 256 are defined on object 210c while it is resting on a support surface 290 and when the tendons 231-238 are to be attached to the object. At least one attachment point 220 is arranged on the top surface 255 so a lifting mechanism may be sustain part of the weight of the object.

In some embodiments of the disclosure, guiding points 201-208 are not in the same position throughout the whole process of positioning and orienting a load since respective guiding means or winches (not illustrated in any of FIGS. 4A, 4B, 5A, 5B, 6A, and 6B) may change their location due to, for example, changes in the position of the structures they are secured to (using, for example, hydraulic cylinders, pantographs or scissor mechanisms). In such case, the attachments of the tendons to the object or load may be readjusted if the positions of the guiding points change substantially once the tendons are already attached.

Tendons 232, 234, 236, and 238 are represented with broken lines for clearer interpretation of the attachment points used (located on the bottom surface 256), but other than that they are similar to tendons 231, 233, 235, and 237 (represented with solid lines).

A first subset of attachment points comprising points 281a, 282a, 283a, and 284a, is arranged on the top surface 255. A second subset of attachment points comprising points 281b, 282b, 283b, and 284b is arranged on the bottom surface 256. Applying a method similar to the one described above in relation to FIGS. 5A and 5B, a possible configuration of the tendons is: tendon 231 with guiding point 201 is attached to point 281a, tendon 232 with guiding point 202 is attached to point 283b, tendon 233 with guiding point 203 is attached to point 282a, tendon 234 with guiding point 204 is attached to point 284b, tendon 235 with guiding point 205 is attached to point 283a, tendon 236 with guiding point 206 is attached to point 281b, tendon 237 with guiding point 207 is attached to point 284a, and tendon 238 with guiding point 208 is attached to point 282b. In some embodiments of the disclosure, applying the method using another tendon as the first tendon, or being the guiding points defined at other positions, or using other selected points that fulfil the criteria at each step of the method, results in other tendon configurations.

Tendons 231-238 are connected to respective winches (not illustrated in FIGS. 6A and 6B) so the tension or free length of the tendons may be individually adjusted so as to position and orient the object 210c.

In some embodiments of the disclosure, guiding points 201-208 are defined on respective guiding means. In some other embodiments of the disclosure where the winches have guiding means already incorporated, or the tendon system does not comprise guiding means at all, guiding points 201-208 are defined on respective winches.

In some embodiments of the disclosure, any of the object 210a, 210b, and 210c is the load to be manipulated. In some other embodiments, any of the object 210a, 210b, and 210c, is an attachment member with the object connected thereto; being the load the sum of the object and the attachment member In some other embodiments, any of the object 210a, 210b, and 210c, is an attachment member and an intermediate support with the object connected thereto; being the load the sum of the object, the intermediate support and the attachment member. In any case the control module adjusts the different elements of the apparatus so that the lifting mechanism at least sustains 51% of the total weight of the attachment member, the object and any intermediate supports that may aid in the connection of the object to the attachment member.

The term "tendon" has been used to encompass any kind of flexible traction element that can be used in the context of the present disclosure, for example, cables, ropes, strings, chains, belts, etc.

In this text, the term "comprises" and its derivations (such as "comprising", etc.) should not be understood in an excluding sense, that is, these terms should not be interpreted as excluding the possibility that what is described and defined may include further elements, steps, etc.

The disclosure is obviously not limited to the specific embodiment(s) described herein, but also encompasses any variations that may be considered by any person skilled in the art (for example, as regards the choice of materials, dimensions, components, configuration, etc.).

The invention claimed is:

1. An apparatus for positioning and orientating a load, the apparatus comprising:
   a support structure movable in a first direction, the support structure establishes an area within which the load can be positioned and orientated;
   a tendon system comprising:
   at least six winches directly mounted on the support structure; and
   at least six tendons, a first end of each of the at least six tendons being connected to a respective one of the at least six winches;
   wherein the apparatus further comprises:
   a lifting mechanism mounted on the support structure and movable in a second direction which is perpendicular to the first direction, the lifting mechanism comprising a further tendon;
   attachment means whereto the load is attachable to suspend from above, the attachment means being connected to a second end of each of the at least six tendons and to a free end of the further tendon; and, a control module being capable of synchronously and
independently operating:
over the at least six winches so as to adjust the free length
of and/or tension supported by the tendon connected to
the respective winch,
the support structure so as to control its movement in the
first direction, and
the lifting mechanism so as to control its movement in the
second direction and the lifting mechanism so as to
adjust the free length of and/or tension supported by the
further tendon connected to the lifting mechanism,
whereby the apparatus provides control of the load in the
six degrees of freedom; wherein the control module is
configured to translate an instruction regarding the
orientation and/or the position of the load in an actuation of the at least six winches, of the lifting mechanism
and of the support structure, such that at least 51% of
the load is sustained by the lifting mechanism and the
load is suspended from the further tendon which is
substantially vertical.

2. The apparatus of claim 1, wherein the attachment means are spatially arranged when attached to the load, such that a projection onto a plane defined by the first and second directions of each of the at least six tendons intersects with another one of the projections of the at least six tendons, this configuration being called cross-linked.

3. The apparatus of claim 1, which further comprises a three-dimensional attachment member or an attachment member in the form of a platform attached to the attachment means, which are distributed in parallel planes or in a same plane, respectively.

4. The apparatus of claim 1, wherein the attachment means are located at the respective second end of the at least six tendons and to the free end of the further tendon.

5. The apparatus of claim 1, wherein the instruction regarding the orientation and/or the position of the load is given by a pre-established trajectory, or manually by remote control.

6. The apparatus of claim 1, wherein the lifting mechanism is mounted on a moving structure which is in turn mounted on the support structure.

7. The apparatus of claim 1, wherein the tendon system comprises:
at least eight winches; and
at least eight tendons, each of the at least eight tendons being connected to a respective one of the at least eight winches.

8. The apparatus of claim 7, wherein the at least six or the at least eight winches are distributed in at least three or four pairs of winches.

9. The apparatus of claim 8, wherein the attachment means are spatially arranged when attached to the load, such that a projection onto a plane defined by the first and second directions of one tendon connected to a winch intersects with the projection of the tendon connected to a winch which is in the closest pair of winches.

10. The apparatus of claim 2, which further comprises a three-dimensional attachment member or an attachment member in the form of a platform attached to the attachment means, which are distributed in parallel planes or in a same plane, respectively.

11. The apparatus of claim 2, wherein the attachment means are located at the respective second end of the at least six tendons and to the free end of the further tendon.

12. The apparatus of claim 2, wherein the instruction regarding the orientation and/or the position of the load is given by a pre-established trajectory, or manually by remote control.

13. A method for positioning and orienting a load, the method including the following steps:
attaching the load to attachment means of an apparatus for positioning and orientating a load, the apparatus comprising a support structure, and a tendon system and a lifting mechanism mounted on the support structure; the attachment means being connected to at least six tendons of the tendon system and to the lifting mechanism, each of the at least six tendons being connected to a respective one of at least six winches, each of the at least six winches being directly mounted on the support structure or being attached to a support secured to the support structure; and,
suspending the load from a free end of a further tendon of the lifting mechanism,
translating an instruction regarding the orientation and/or the position of the load in an actuation of the at least six winches (104), of the lifting mechanism and of the support structure such that at least 51% of the load is sustained by the lifting mechanism and the load is suspended in a substantially vertical manner by synchronously and independently operating:
the at least six winches so to adjust the free length of and/or tension supported by the tendon connected to the respective winch,
the support structure so as to control its movement in the first direction, and
the lifting mechanism so as to control its movement in the second direction and the lifting mechanism so as to adjust the free length of and/or tension supported by the further tendon connected to the lifting mechanism,
which provides control of the load in the six degrees of freedom.

14. The method of claim 13, which further comprises spatially attaching the attachment means to the load such that the at least six tendons are cross-linked, such that a projection onto a plane defined by the first and second directions of each of the at least six tendons intersects with another one of the projections of the at least six tendons, that is in cross-linked configuration.

15. The method of claim 13, wherein the instruction regarding the orientation and/or the position of the load is translated firstly in an actuation of the at least six winches and subsequently of the lifting mechanism and of the support structure.

16. The method of claim 13, wherein the instruction regarding the orientation and/or the position of the load is translated firstly in an actuation of the lifting mechanism and subsequently of the at least six winches and of the support structure.

17. The method of claim 13, wherein the method comprises attaching the load to attachment means which are connected to at least eight tendons of the tendon system, each of the at least eight tendons being connected to a respective one of at least eight winches.

18. An apparatus for positioning and orientating a load, the apparatus comprising:
a support structure movable in a first direction, the support structure establishes an area within which the load can be positioned and orientated;
a tendon system comprising:
at least six winches, each of the winches is attached to a support secured to the support structure; and at least six tendons, a first end of each of the at least six tendons being connected to a respective one of the at least six winches;

wherein the apparatus further comprises:
- a lifting mechanism mounted on the support structure and movable in a second direction which is perpendicular to the first direction, the lifting mechanism comprising a further tendon;
- attachment means whereto the load is attachable to suspend from above, the attachment means being connected to a second end of each of the at least six tendons and to a free end of the further tendon; and,
- a control module being capable of synchronously and independently operating:
    - the at least six winches so as to adjust the free length of and/or tension supported by the tendon connected to the respective winch,
    - the support structure so as to control its movement in the first direction, and
    - the lifting mechanism so as to control its movement in the second direction and the lifting mechanism so as to adjust the free length of and/or tension supported by the further tendon connected to the lifting mechanism,
    - whereby the apparatus provides control of the load in the six degrees of freedom; wherein the control module is configured to translate an instruction regarding the orientation and/or the position of the load in an actuation of the at least six winches, of the lifting mechanism and of the support structure, such that at least 51% of the load is sustained by the lifting mechanism and the load is suspended from the further tendon which is substantially vertical.

19. The apparatus of claim 18, wherein the attachment means are spatially arranged when attached to the load, such that a projection onto a plane defined by the first and second directions of each of the at least six tendons intersects with another one of the projections of the at least six tendons, this configuration being called cross-linked.

20. The apparatus of claim 18, wherein the lifting mechanism is mounted on a moving structure which is in turn mounted on the support structure.

21. The apparatus of claim 18, wherein the tendon system comprises:
- at least eight winches; and
- at least eight tendons, each of the at least eight tendons being connected to a respective one of the at least eight winches.

22. The apparatus of claim 20, wherein the at least six or the at least eight winches are distributed in at least three or four pairs of winches.

23. The apparatus of claim 22, wherein the attachment means are spatially arranged when attached to the load, such that a projection onto a plane defined by the first and second directions of one tendon connected to a winch intersects with the projection of the tendon connected to a winch which is in the closest pair of winches.

* * * * *